US012008044B2

(12) United States Patent
Goyal

(10) Patent No.: US 12,008,044 B2
(45) Date of Patent: Jun. 11, 2024

(54) METHODS AND SYSTEMS FOR ELECTRONICALLY FACILITATING QUESTION ANSWERING

(71) Applicant: Human Quest Inc., Parsippany, NJ (US)

(72) Inventor: Ashish Goyal, Parsippany, NJ (US)

(*) Notice: Subject to any disclaimer, the term of this patent is extended or adjusted under 35 U.S.C. 154(b) by 60 days.

(21) Appl. No.: 17/968,275

(22) Filed: Oct. 18, 2022

(65) Prior Publication Data

US 2023/0124279 A1  Apr. 20, 2023

Related U.S. Application Data

(60) Provisional application No. 63/272,615, filed on Oct. 27, 2021, provisional application No. 63/257,477, filed on Oct. 19, 2021.

(51) Int. Cl.
*G06Q 20/14* (2012.01)
*G06F 3/0482* (2013.01)
(Continued)

(52) U.S. Cl.
CPC ...... *G06F 16/90332* (2019.01); *G06F 3/0482* (2013.01); *G06Q 20/145* (2013.01); *H04L 51/216* (2022.05)

(58) Field of Classification Search
CPC ............ G06F 16/90332; G06F 3/0482; G06Q 20/145; G06Q 20/065; H04L 51/216; H04L 51/214
See application file for complete search history.

(56) References Cited

U.S. PATENT DOCUMENTS

| 8,794,971 B2 | 8/2014 | Feng et al. | |
| 2018/0004732 A1* | 1/2018 | Brunn | G06F 3/0482 |
| 2021/0050118 A1* | 2/2021 | Goldstein | H04L 67/306 |

FOREIGN PATENT DOCUMENTS

| CN | 107239983 B | 12/2020 | |
| EP | 1669900 A2 * | 6/2006 | G06F 17/30654 |

(Continued)

OTHER PUBLICATIONS

Isinkaye et al.: Recommendation systems: Principles, method and evaluation, 2015, Egyptian Information Journall, Cairo University, Egypt, 16, pp. 261-273. (Year: 2015).*
(Continued)

*Primary Examiner* — Bijendra K Shrestha
(74) *Attorney, Agent, or Firm* — Evergreen Valley Law Group; Kanika Radhakrishnan

(57) ABSTRACT

Methods and systems for seeking answers are disclosed. The method includes receiving a question from a seeker device. The method includes determining responder(s) for answering the question, by identifying available responders and determining matching responders based on at least a threshold degree of similarity in a corresponding responder profile with the question. The method includes facilitating a display of responder profile(s) associated with the responder(s) to the seeker device in a predetermined order. The method includes upon receiving a first selection of a single responder profile, establishing a first communication channel between the seeker device and a responder device for providing an answer. The method includes upon receiving a second selection of multiple responder profiles, transmitting the question to responder devices. Upon receipt of interest-to-answer input from at least one responder profile, a second communication channel is established between the seeker device and at least one responder device.

18 Claims, 9 Drawing Sheets

(51) Int. Cl.
*G06F 16/9032* (2019.01)
*H04L 51/216* (2022.01)

(56) References Cited

FOREIGN PATENT DOCUMENTS

WO  WO-2007109305 A2 *  9/2007  ....... G06F 17/30654
WO     2015139119 A1    9/2015

OTHER PUBLICATIONS

Adam et al.: AI-based chatbots in customer service and their effects on user compliance, Jul. 2019, pp. 427-455 (Year: 2019).*
Susanne Beck, Tiare-Maria Brasseur, Marion Poetz, Henry Sauermann, Crowdsourcing research questions in science, Research Policy vol. 51, Issue 4, May 2022, 104491, Germany.

* cited by examiner

METHODS AND SYSTEMS FOR ELECTRONICALLY FACILITATING QUESTION ANSWERING

TECHNICAL FIELD

The present invention relates to a crowdsourcing platform for seeking appropriate answers from experts and, more particularly, for methods and systems for seeking answers.

BACKGROUND

Virtually everything can be found on the Internet, which is a vast repository of knowledge and information. However, there could be circumstances in which getting an exact answer to a particular question becomes difficult for a user even with the usage of the internet. There may be a need for specific knowledge or local expertise to answer that question. Fortunately, there are websites out there that can be utilized to not only gather ideas and opinions from people regarding a specific topic but also to identify experts in various fields.

However, such websites are associated with limitations such as these websites allowing only one-way contact and having time constraints in answering follow-up queries. In other words, users can ask a question and then wait to get a response having keywords that match the question. In addition, if a user who posed the question is dissatisfied with the answer(s) given, the user should react with a new question that could be connected to the original, and this process continues until the user with the questions is content with the responses. This makes the overall question-answer process time-consuming as the answers to the questions are not found instantly.

Additionally, numerous parties may respond to a single question that a user posts on a website, leading to the possibility of various responses with varying viewpoints, expertise, and knowledge. In such a situation, there is a chance that the user would become confused when selecting the best solution, making such websites less effective and less credible for people seeking answers.

Hence, there exists a technological need for more efficient methods and systems for facilitating pertinent answers to questions from suitable responders.

SUMMARY

Various embodiments of the present disclosure provide methods and systems for facilitating answers to questions from appropriate responders.

In an embodiment, a computer-implemented method is disclosed. The computer-implemented method includes receiving a question from a seeker device associated with a seeker for receiving an answer to the question. The method also includes determining one or more responders for answering the question, by identifying available responders from a plurality of responders who are accessible by the server system based on an availability status of each of the plurality of responders. The method further includes determining the one or more responders for answering the question, by determining matching responders from among the plurality of responders based at least on a threshold degree of similarity in a corresponding responder profile with the question. Further, the method includes facilitating a display of one or more responder profiles associated with the one or more responders to the seeker device in a predetermined order based at least on one or more parameters associated with the one or more responder profiles. Furthermore, the method includes, upon receiving a first selection of a single responder profile of the one or more responder profiles, establishing a first communication channel between the seeker device and a responder device associated with the selected responder profile for providing the answer. The method further includes, upon receiving a second selection of multiple responder profiles of the one or more responder profiles, transmitting the question to responder devices associated with the selected multiple responder profiles. Upon receipt of an interest-to-answer input from at least one responder profile, a second communication channel is established between the seeker device and at least one responder device associated with the at least one responder.

In another embodiment, a server system is disclosed. The server system includes a memory configured to store instructions, a communication interface, and a processor configured to execute the instructions stored in the memory and thereby causing the server system to receive a question from a seeker device associated with a seeker for receiving an answer to the question. The server system is also caused to determine one or more responders for answering the question, by identifying available responders from a plurality of responders who are accessible by the server system based on an availability status of each of the plurality of responders. Further, the server system is caused to determine the one or more responders for answering the question, by determining matching responders from among the plurality of responders based on at least a threshold degree of similarity in a corresponding responder profile with the question. Furthermore, the server system is caused to facilitate a display of one or more responder profiles associated with the one or more responders to the seeker device in a predetermined order based at least on one or more parameters associated with the one or more responder profiles. The server system is caused to upon receiving a first selection of a single responder profile from the one or more responder profiles, establish a first communication channel between the seeker device and a responder device associated with the selected responder profile for providing the answer. Further, the server system is also caused to transmit the question to responder devices associated with the selected multiple responder profiles, upon receiving a second selection of multiple responder profiles of the one or more responder profiles. Further, upon receipt of an interest-to-answer input from at least one responder profile, a second communication channel is established between the seeker device and at least one responder device associated with the at least one responder.

BRIEF DESCRIPTION OF THE FIGURES

For a more complete understanding of example embodiments of the present technology, reference is now made to the following descriptions taken in connection with the accompanying drawings in which.

Figure 1:
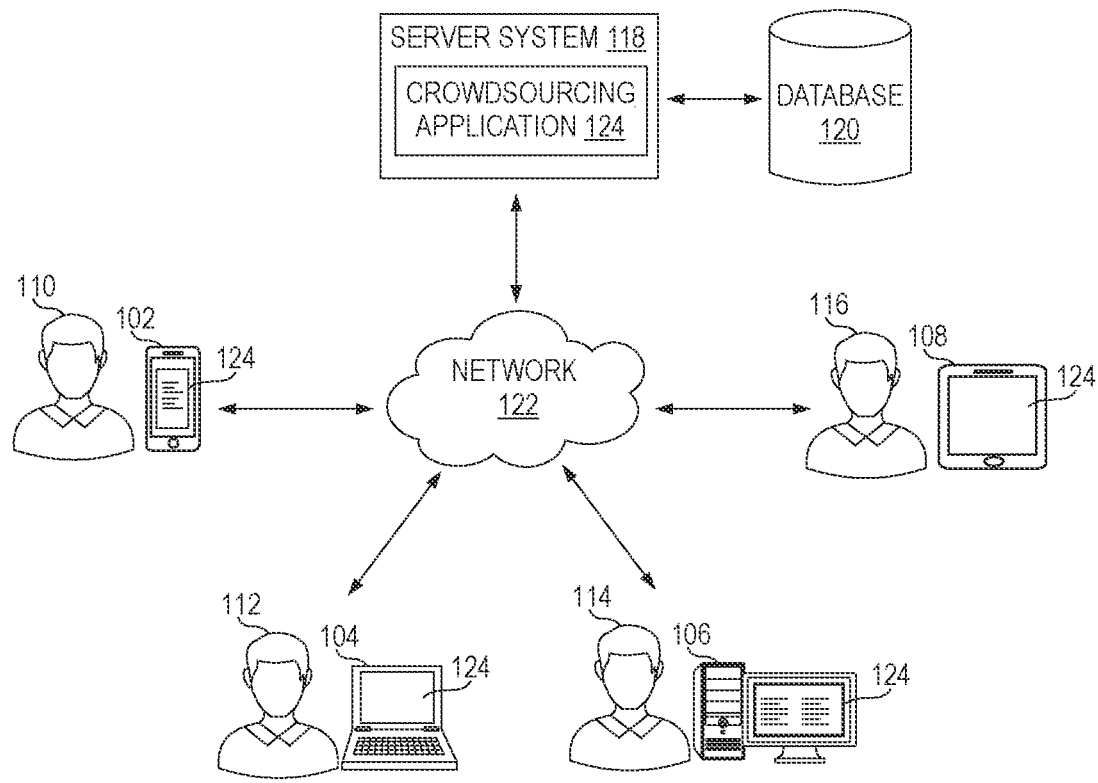
FIG. 1 is an example representation of an environment related to at least some examples of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The terms "application", "crowdsourcing application", and "question-and-answer (Q-and-A) application" may have been used interchangeably throughout the description. Unless the context suggests otherwise, these terms refer to a software application or a set of instructions corresponding to the disclosed system, running in a computing device for a user, enabling the user to seek answers and to provide answers through the computing device.

The terms "user", "seeker", "requester", and "client" may have been used interchangeably throughout the description, and unless the context suggests otherwise, these terms refer to a person looking for an answer and can pay money for seeking the answer.

The terms "worker", "provider", "expert", "crowd", "service provider", and "responder" may have been used interchangeably throughout the description, and unless the context suggests otherwise, these terms refer to a person who provides an answer and can earn money by providing the answer.

The terms "question", "query", "problem", "work", "project", and "request" may have been used interchangeably throughout the description, and unless the context suggests otherwise, these terms refer to a task or tasks posted by requesters who are willing to get is completed from experts by paying for it.

The terms "answer", "response", and "solution" may have been used interchangeably throughout the description, and unless the context suggests otherwise, these terms refer to input from a crowd or experts attempting to perform the task or tasks posted by the requesters in return for an earning.

The term 'predefined amount' refers to a fixed charge rate per time unit, for example, charge rate/minute or charge rate/hour, or a fixed charge irrespective of time, depending upon the context.

OVERVIEW

Various example embodiments of the present disclosure provide methods and systems to facilitate question answering from suitable answer providers in an interactive mode.

In an embodiment, a system provides a crowdsourcing application for users to get answers to their questions in an interactive mode which may be in real-time or near real-time. As used herein, the term "crowdsourcing" refers to a practice of gathering data or input for work or projects from many individuals, either paid or unpaid, usually online. Further, the concept of crowdsourcing is applied to a process of seeking answers to the questions (could also be a work or a project that needs to be completed) received from the users or seekers. The seekers would be expecting to seek a solution or an answer from other users or experts for the questions, and hence post the questions on the application. The system provides the application for crowdsourcing questions with answers, where providers are paid a predefined amount by the seekers for providing the answers. The predefined amount may be calculated based on a fixed charge rate per unit of time (e.g., charge/minute, or charge/hour), or a total fixed charge rate invariant of time.

Further, the system recommends matching providers' profiles to the seeker on a seeker device upon receiving the question from the seeker. The system performs an extensive search of provider profiles corresponding to providers registered with the system, where the provider profiles have information matching with keywords in the question of the seeker based at least on a machine learning model. The system may also check for an availability status associated with the provider profiles prior to recommending the corresponding provider profiles for the seeker. In an example, the availability status may be either 'online' or 'offline'. Thus, the recommendation not only depends on the matching of the provider profiles with the question but also on the availability status associated with the provider profiles. Based on the recommendations received, the system enables the seeker to go through a profile of each of the recommended providers, and select one or more providers for receiving the answer, based on a rating and charge rate (dollars per minute) in the profile of the recommended providers. However, if the seeker does not perform any action until a threshold time is reached upon receiving the recommendations, and/or if the responders don't respond within the threshold time upon receiving a selection from the seeker, then the recommendations and/or the selected provider profiles may no longer be displayed on the seeker device. The system may have to recommend one or more other providers for the seeker to select and/or the seeker may have to select a new set of recommended provider profiles.

Further, in one embodiment, the seeker may directly select a provider profile corresponding to one of the recommended providers and place the call, in case the seeker is willing to connect with the provider instantly, thereby enabling the seeker to receive the answers to the questions in real-time if the call is accepted by the provider. Thus, the system provides the answers to the questions from the seeker through an option of instantly connecting the seeker and the provider via an interactive phone call. The interactive phone call may be supported by a chat option, a screen-sharing option, a video call option, a whiteboarding option, and/or the like. The provider may receive a notification of the call instantly when the availability status associated with the provider corresponds to 'online', and then the provider either accepts or rejects the call.

In another embodiment, the seeker may select a set of provider profiles corresponding to a set of providers from the recommended providers and may confirm the selection. Upon confirmation, the question is shared with the set of providers. Then, the set of providers may receive a notification indicating that a question is received. The system further provides the available providers of the set of providers to select an option, where the option may be to respond instantly, respond with a predefined delay, or not respond. Further, the system connects the seeker and the provider immediately when the provider selects the option to respond instantly, or after the predefined delay when the provider selects the option to respond after the predefined delay. Thus, the system provides the answers to the questions in near real-time through an option of merely sharing the question with the available providers of the set of providers selected by the seeker based on the recommendation from the system.

In an embodiment, the system provides the answers to the questions in the pay-as-you-go model which refers to an option in which the seekers pay a predefined amount per time unit to receive an answer to their questions, and the providers make an earning by providing answers to the questions from the seekers. For example, the charge rate (dollars per minute) set in the profile of the recommended providers maybe 2 dollars per minute. Further, the seeker will be charged for each minute of the call duration based on the charge rate set by the provider with whom the seeker has connected. Suppose the call duration was for about 30 minutes, then, the total charge which the seeker is payable to the provider would be about 60 dollars.

In an alternative embodiment, the predefined amount may be pre-fixed by the provider, and accordingly, the seeker may have to pay, upon receiving the answer to the questions. For example, the predefined amount may be fixed to 60 dollars for each answer irrespective of the time spent. Thus, upon receiving the answer, the seeker might pay the predefined amount to the provider.

In addition, the system transmits the answer to the seeker device of the seeker upon receiving payment of the predefined amount from the seeker. The payment is then split between the provider who provided the answer and an owner of the system providing a service to the seeker and the provider to connect through the application.

Subsequently, the system enables the providers to decide on the charge rate for providing an answer to each question they receive. The system further enables the providers to set an availability status either to 'online' or 'offline' based on their availability for receiving calls from the seekers. The provider may receive a notification of the call instantly when the availability status corresponds to 'online', and then the provider either accepts or rejects the call.

Additionally, the system may also facilitate one or more additional features for the seeker and the provider. The one or more additional features may include at least one of recording the conversation, broadcasting live connection requests, providing cryptographic tokens, adding credits to a seeker's wallet, earning a third percentage of the predefined amount upon sending an invitation-to-join message, validating one or more factors associated with at least one of the first communication channel, the second communication channel, and the at least one responder, reporting a complaint, requesting for refund of the predefined amount, providing feedback, and the like.

Various embodiments of the present disclosure offer multiple advantages and technical effects. For instance, the present disclosure provides a crowdsourcing application for users to get answers to their questions instantly through an interactive mode, as the users can directly place a call to an expert accessible to the system. Thus, it makes the system more efficient and more reliable as the users can receive the answers to their questions instantly. Further, since the seekers may call a provider directly to get the answers to their questions, this ensures that the answers they receive are suitable and prevents any misunderstanding for the seeker.

Various embodiments of the methods and systems for seeking answers are described hereinafter with reference to FIG. 1 to FIG. 7.

FIG. 1 is an example representation of an environment 100 related to at least some examples of the present disclosure. Although the environment 100 is presented in one arrangement, other embodiments may include the parts of the environment 100 (or other parts) arranged otherwise depending on, for example, the way in which the system facilitates crowdsourcing of questions for seeking answers to the questions. The example representation of the environment 100 generally includes a plurality of user devices 102, 104, 106, and 108 associated with a plurality of users 110, 112, 114, and 116, a server system 118, and a database 120 connected to, and in communication with (and/or with access to) a wireless communication network (e.g., a network 122).

In the illustrated environment 100, the user devices 102-108 are depicted as a mobile phone, a laptop, a desktop computer, and a tablet respectively. However, the user devices 102-108 may include any other suitable electronic or computing device as well. For instance, the computing device may be, for example, a smartphone, a personal computer, an electronic tablet, a wearable device, a smart device such as smart TV or smart appliance, etc.

In one example, the users 110 and 112 may be seekers of answers to their questions, and the user 114 and 116 may be responders providing the answers to the questions. Thus, the user devices 102 and 104 may be termed as 'seeker devices' associated with the seekers, and the user devices 106 and 108 may be termed as 'responder devices' associated with the responders. In another example, the users 114 and 116 may be seekers of answers to their questions, and the users 110 and 112 may be responders providing the answers to the questions. In this example, the user devices 106 and 108 may be seeker devices associated with the seekers, and the user devices 102 and 104 may be responder devices associated with the responders. Moreover, a user who is a seeker seeking answers in one scenario can also be a responder who can provide answers in another scenario and vice versa. For the purposes of description of the present disclosure, the users 110 and 112 are hereinafter interchangeably referred to as "seekers 110 and 112", and the users 114 and 116 are hereinafter interchangeably referred to as "responders 114 and 116". Similarly, the user devices 102 and 104 are hereinafter interchangeably referred to as seeker devices 102 and 104, and the user devices 106 and 108 are hereinafter interchangeably referred to as responder devices 106 and 108.

It should be noted that the number of users and user devices described herein are only used for exemplary purposes and do not limit the scope of the invention. The main objective of the invention is to provide a crowdsourcing application that can receive questions from seekers (e.g., seeker 110) and connects the seekers with appropriate responders (e.g., responder 114) so that the seekers can receive the most appropriate answer for their question in real-time or in near real-time.

The server system 118 may be deployed as a standalone server or can be implemented in the cloud as software as a service (SaaS). The server system 118 provides or hosts a crowdsourcing application 124 for enabling the seekers 110 and 112 to seek answers to their questions. For example, the crowdsourcing application 124 may be a mobile application, a desktop application, a website, or a plugin in a third-party application. For example, the third-party application may be any existing crowdsourcing application, any existing Question-and-Answer (Q-and-A) application, and/or the like facilitating the execution of tasks similar to that performed by the server system 118. In some embodiments, the crowdsourcing application 124 can be implemented as operating system extensions, modules, plugins, and the like. Further, the crowdsourcing application 124 may be operative in cloud infrastructure, or the crowdsourcing application 124 may be executed within or as a virtual machine (VM) or virtual server that may be managed in the cloud infrastructure.

The server system 118 is embodied in at least one computing device in communication with the network 122 and/or embodied in at least one non-transitory computer-readable media. For example, an instance of the crowdsourcing application 124 is accessible to the user devices 102-108 as shown in the environment 100 in FIG. 1. This enables the users 110-116 to be able to access the server system 118 on the user devices 102-108. The crowdsourcing application 124 is a set of computer-executable codes configured to provide user interfaces (UIs) enabling the seekers 110 and 112 to seek answers to their questions and the responders 114 and 116 to provide answers to the questions posted on the crowdsourcing application 124, which will be explained further in detail. In an embodiment, the server system 118 may provide the crowdsourcing application 124, in response to a request received from the user devices 102-108 via the network 122. In another embodiment, the crowdsourcing application 124 may be factory-installed on the user devices 102-108.

The network 122 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 122 in accordance with various wired and wireless communication protocols, such as, Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, any future communication protocol, or any combination thereof. The network 122 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 122 may include multiple different networks, such as a private network made accessible by the user devices 102-108, the server system 118, and the database 120 separately, and/or a public network (e.g., the Internet) through which the user devices 102-108, the server system 118, and the database 122 may communicate.

In one embodiment, the server system 118 is configured to perform one or more of the operations described herein. In particular, the server system 118 is configured to facilitate a seeker (e.g., seeker 110) to provide a question through a seeker device (e.g., seeker device 102) for receiving an answer to the question. The seeker 110 may provide the question by launching the crowdsourcing application 124 on the seeker device 102 and entering the question in a 'ask question' field displayed on a user interface (UI) associated with the crowdsourcing application 124. Moreover, for the seeker 110 to be able to provide the question to the crowdsourcing application 124, the seeker 110 may have to create an account and a seeker profile on the crowdsourcing application 124. Thus, the server system 118 may create the seeker profile for the seeker 110 upon receiving a plurality of seeker details via the seeker device 102. The plurality of seeker details may include, but not limited to, a username, an email identity (ID), contact details, qualification, specialization, preferred subject categories, and the like corresponding to the seeker 110. Upon creation of the seeker profile, the seeker 110 may login using login credentials and post the question on the crowdsourcing application 124.

Further, the server system 118 receives the question. Upon receiving, the question, the server system 118 is configured to find appropriate responders that can respond to this question. Thus, the server system 118 may be further configured to determine one or more responders (e.g., responder 116) for answering the question, by identifying available responders from a plurality of responders (e.g., responder 114 and 116) who are accessible by the server system 118 based on an availability status of each of the plurality of responders. Further, the server system 118 may determine the one or more responders for answering the question, by determining matching responders from among the plurality of responders based on at least a threshold degree of similarity in a corresponding responder profile with the question.

Furthermore, for the server system 118 to be able to determine the one or more responders for answering the question received from the seeker 110, the server system 118 may have the one or more responders pre-registered with the crowdsourcing application 124. Thus, the server system 118 may create an account and a responder profile for each of the plurality of responders that are interested in providing answers to questions in exchange for a predetermined reward or money, by receiving a plurality of responder details via a corresponding responder device (e.g., responder device 106 and 108). The plurality of responder details may include, but are not limited to, a username, an email ID, contact details, qualification, specialization, preferred subject categories, and the like.

Subsequently, a plurality of responder profiles corresponding to the plurality of responders registered with the server system 118 may be stored in the database 120. Moreover, each of the plurality of responder profiles may be associated with the availability status. The availability status may be either 'online' or 'offline'. Further, the server system 118 may be configured to enable the plurality of responders to set the availability status on the crowdsourcing application 124 through the respective plurality of responder devices. Based on the availability status, the one or more available responders of the plurality of responders may be identified by the server system 118 who are available for answering the question.

In addition, the server system 118 may extract keywords from the plurality of responder profiles accessible by the server system 118. The keywords may correspond to the preferred subject categories chosen by the plurality of responders, previously answered questions, specialization, and/or the like. The server system 118 may further determine the intent of the question. The intent may be associated with, but not limited to, a subject category chosen by the seeker 110. Later, based on the keywords extracted from the plurality of responder profiles and the intent of the question, the server system 118 may determine a degree of similarity in at least one of the plurality of responder profiles with the question to be greater than or equal to a threshold similarity using a machine learning (ML) model. Thus, in an embodiment, the server system 118 is configured to determine the one or more responders for answering the question based at least on the ML model.

As used herein, the term "machine learning" refers to a field of inquiry devoted to understanding and building methods that 'learn', that is, methods that leverage data to improve performance on some set of tasks. It is seen as a part of artificial intelligence (AI). Further, ML models that may be used by the server system 118 may be supervised, semi-supervised, unsupervised, or reinforcement. Choosing the right ML model for analyzing data depends on multiple factors such as, but not limited to, data size, quality, diversity, expected outcome from the analysis of the data, accuracy, training time, data points, predetermined parameters, and the like. Further, when it comes to choosing the ML model, there exists a plurality of ML techniques that can be employed based on the application domain, the ML techniques come with their respective ML models. The plurality of ML techniques may include, but are not limited to, regression, classification, clustering, dimensionality reduction, ensemble methods, neural nets and deep learning, transfer learning, reinforcement learning, natural language processing, word embeddings, and the like. Moreover, the working and functionality of all of the ML models and the ML techniques aforementioned are known to a person skilled in the art, in accordance with an embodiment of the present disclosure.

Upon determining the threshold degree of similarity, the server system 118 may determine one or more matching responders. Furthermore, based on the identification of the availability status and the determination of the one or more available responders, the server system 118 may then determine one or more responders that can answer the question. For example, the responders 114 and 116 may be the one or more responders determined by the server system 118 that can answer the question.

Upon determining the one or more responders 114 and 116, the server system 118 may facilitate a display of one or more responder profiles associated with the one or more responders 114 and 116 to the seeker device 102 in a predetermined order based at least on one or more parameters associated with the one or more responder profiles. In one embodiment, the one or more parameters include at least one of a rate set by the one or more responders for answering the question, a rating associated with the one or more responder profiles, quality of answers, time dedicated by the seeker for answering questions, and the like.

The server system 118 may further facilitate the seeker 110 to select at least one of the one or more responder profiles displayed on the seeker device 102. The seeker 110 may read through a complete profile of each of the one or more responders 114 and 116 prior to selecting one. The seeker 110 may check for the one or more factors such as, but not limited to, a rate (dollars per minute) set by the one or more responders for answering the question and a rating associated with the one or more responder profiles. Further, based on the one or more factors, the seeker 110 may select the one or more responders (114, 116, or both).

In one embodiment, the seeker 110 makes a first selection, wherein the first selection may correspond to selecting a single responder profile of the one or more responder profiles displayed on the seeker device 102. Further, the seeker 110 may directly place a call via the crowdsourcing application 124 by clicking on a 'call' button displayed adjacent to the responder profile selected by the seeker 110 on the crowdsourcing application 124. Thus, the server system 118 may establish a first communication channel between the seeker device 102 and a responder device (e.g., responder device 106) associated with the selected responder profile for providing the answer, upon receiving the first selection.

In another embodiment, the seeker 110 makes a second selection, wherein the second selection may correspond to selecting multiple responder profiles of the one or more responder profiles displayed on the seeker device 102. Suppose the seeker 110 may have selected the responder profiles corresponding to the responders 114 and 116. Moreover, the seeker 110 may have to read through a complete profile of each of the responders 114 and 116. Upon reading through the complete profiles, the seeker 110 may select the multiple responder profiles of the one or more responder profiles displayed on the seeker device 102. Further, upon receiving the second selection, the server system 118 may be configured to transmit the question to responder devices 106-108 associated with the selected multiple responder profiles. Furthermore, upon receipt of interest-to-answer input from at least one responder profile a second communication channel is established between the seeker device 102 and at least one responder device (106 or 108) associated with the at least one responder.

Upon making the first selection or the second selection, the one or more responders may be notified about the same. Thus, the server system 118 may be configured to notify a single responder associated with the single responder profile and multiple responders associated with the multiple responder profiles about the selection based on the first selection and the second selection respectively, via a predefined notification medium. The predefined notification medium may include a voice call, a video call, a chat, an email, a pop-up notification, or the like. Further, upon receiving the notification, the one or more responders (114 and/or 116) may respond accordingly.

In the case of the first selection, suppose the single responder selected by the seeker 110 may be the responder 114. Thus, in one example scenario, upon receiving the notification of the call, the responder 114 may respond by rejecting the call. In another example scenario, upon receiving the notification of the call, the responder 114 may respond by answering the call, and hence the first communication channel is established between the seeker device 102 and the responder device 106 associated with the responder 114 for providing the answer. Further, the seeker 110 and the responder 114 may have a conversation with each other about the question of the seeker 110 and that the answer may be provided to the seeker 110 for the question in the call itself through the first communication channel. The first communication channel may be associated with one or more features such as, but not limited to, a chat that may be used for sharing one or more file attachments, whiteboarding, screen sharing, a video calling facility, projecting a hologram video in space which may be implemented via smart devices having inbuilt hologram projection capabilities, and the like. For example, the smart devices may include a smartphone, a smart watch, smart glasses, and the like.

In the case of the second selection, suppose the responders 114 and 116 may be the one or more responders determined by the server system 118 that can answer the question. In this case, the notification may correspond to transmitting the question to the responder devices (106 and 108) associated with the responders 114 and 116. Thus, in one embodiment, upon receiving the notification, the responders 114 and 116 may respond through at least three responding options. Thus, the server system 118 may also be configured to upon transmitting the question to the responder devices 106-108 associated with the selected multiple responder profiles, provide at least three responding options by the selection of which multiple responders associated with selected multiple responder profiles may respond. Examples of three responding options may include an immediate connecting option (e.g., 'call now' option), a connecting with a predefined delay option (e.g., 'call after fifteen minutes' option), and rejecting to connect option (e.g., 'not interested' option).

In one embodiment, the responder 114 responds by selecting the immediate connecting option. Further, the responder 116 has responded with any of the at least three responding options but after the responder 114 had already responded. A decision may have to be taken about a response from which responder (i.e. the responder 114 or the responder 116) should be prioritized. Thus, the server system 118 may be configured to determine a priority associated with a response received from the selected multiple responder profiles based at least on predefined criteria. The predefined criteria may include prioritizing a response including the immediate connecting option that is received first in time among multiple responses received from the selected multiple responder profiles.

Further, since the response from the responder 114 includes the immediate connecting option and is received prior to the response of the responder 116, the response from the responder 114 is prioritized by the server system 118. This initiates transmission of the interest-to-answer input to the server system 118. Thus, the server system 118 may detect a receipt of the interest-to-answer input from a responder profile associated with the responder 114. Moreover, upon receipt of the interest-to-answer input, the server system 118 may establish the second communication channel between the seeker device 102 and the responder device 106 associated with the responder 114 for providing the answer. The second communication channel may correspond to an initiation of a call between the seeker device 102 and the responder device 106. Further, the seeker 110 and the responder 114 may have a conversation with each other about the question of the seeker 110 and the answer may be provided to the seeker 110 for the question in the call itself through the second communication channel. The second communication channel may also be associated with the one or more features. Further, the server system 118 may notify the responder 116 with a notification indicating the responder 116 about the call being already placed between the seeker device 102 and the responder device 106 via the predefined notification medium.

In another embodiment, the responder 114 responds by selecting the 'connecting with a predefined delay' option. For example, the predefined delay may be about 15 minutes. Further, if the responder 116 responds with the 'immediate connecting option', the response from the responder 116 may be prioritized as per the predefined criteria, and the server system 118 may establish the second communication channel between the seeker device 102 and the responder device 108 associated with the responder 116 for providing the answer. Further, after this step, the process described in the previous paragraph repeats, but between the seeker device 102 and the responder device 108.

In alternative embodiments, based on the option the responders (114 and 116) selected and who selected first, the server system 118 may prioritize the responses from the corresponding responders and the further process continues as explained above. In case, the responders 114 and 116 may have selected 'connecting with a predefined delay' option, then the server system 118 may notify the seeker 110 about the selection and enables the seeker 110 to either accept or reject one or both of the corresponding responses from the responders 114 and 116. Further, the rejecting to connect option, if selected by any of the responders 114 and 116, indicates that the corresponding responders 114 or 116 may not be willing to connect with the seeker 110.

Subsequently, consider a case where the second communication channel may have to be established between the seeker device 102 and the at least one responder device 106 or 108 associated with the at least one responder, whose responder profile may have been selected by the seeker 110. In such a case, suppose, the responders 114 and 116 have responded by selecting at least one of the at least three responding options. Further, the seeker 110 may have received a notification indicating the options selected by the responders 114 and 116. The seeker 110 may have to perform a predefined action within a threshold time, otherwise, the seeker 110 may have to repeat a step of performing the second selection of the multiple responder profiles of the one or more responder profiles. Thus, the server system 118 may be configured to notify the seeker 110 to perform a predefined action within a threshold time via the predefined notification medium, based on the response including the selection of one of the at least three responding options by each of the multiple responders. The server system 118 may also be configured to trigger the seeker 110 to repeat the performing of the second selection on the seeker device 102 when the predefined action is detected to be not performed by the seeker 110 within the threshold time. For example, the threshold time may be about 15 minutes to about 30 minutes. Further, the predefined action may include accepting or rejecting to connect with the at least one responder of the multiple responders associated with the selected multiple responder profiles.

In addition, upon receiving the answer to the question, establishing the first communication channel, or establishing the second communication channel, the seeker 110 may have to make a payment of a predefined certain amount based at least on the rate set in the selected multiple responder profiles. Thus, the server system 118 may be configured to determine the predefined amount to be paid by the seeker 110 for unlocking an access to the answer provided to the seeker 110 through one of the first communication channel and the second communication channel, based at least on the one or more parameters and transaction criteria. The server system 118 may further be configured to trigger the seeker 110 to perform a transaction of the predefined amount to the server system 118, upon determining the predefined amount.

The server system 118 may be configured to transmit a first percentage of the predefined amount to the single responder profile or one of the multiple responder profiles based at least on the establishment of the first communication channel or the second communication channel and the transaction criteria, upon receiving the predefined amount. Moreover, the server system 118 may then be configured to transmit a second percentage of the predefined amount to an owner of the crowdsourcing application 124 who has built the crowdsourcing application 124. The transaction criteria may include a requirement of splitting the predefined amount paid by the seeker 110 between a responder of the question and the owner of the crowdsourcing application 124 in pre-set proportions by the owner of the crowdsourcing application 124. In one embodiment, the server system 118 may use a predefined transaction mode for performing the transaction of the predefined amount. For example, the predefined transaction mode may include a third-party payment gateway such as credit cards, debit cards, net banking, and the like, Additionally, in some embodiments, the server system 118 may be configured to facilitate a recording of a conversation on the first communication channel and the second communication channel. The server system 118 may also be configured to facilitate the one or more responders capable of answering the question, to broadcast live connection requests to a plurality of seekers accessible by the server system 118. The server system 118 may further be caused to provide cryptographic tokens for enabling the seeker 110 and 112 to purchase one or more responder services and other merchandise on a crowdsourcing application 124 rendered by the server system 118 on the seeker device 102 and 104.

Moreover, the server system 118 may be configured to add credits to a seeker's wallet upon registration of the seeker 110 with the server system 118, where the credits are be used for establishing the first communication channel and the second communication channel based on the first selection and the second selection respectively.

Further, the server system 118 may also facilitate the seeker 110 and the plurality of responders to send an 'invitation-to-join' message to corresponding personal contacts. The invitation-to-join message includes a request asking the corresponding personal contact to register with the server system 118. The server system 118 may also be configured to add a third percentage of the predefined amount to the seeker's wallet and a responder's wallet when the personal contacts that received the invitation-to-join message access the server system 118 for a predefined time period.

In addition, the server system 118 may further be configured to facilitate the seeker 110 to validate one or more factors associated with at least one of the first communication channel, the second communication channel, and the at least one responder during an initial predefined period of the conversation between the seeker 110 and the at least one responder. In one embodiment, during the predefined period, the seeker 110 is not charged for the conversation. The server system 118 may further be configured to facilitate the seeker 110 and the one or more responders 114 and 116 to report a complaint about each other based at least on the conversation.

The server system 118 may then be configured to facilitate the seeker 110 to request for refund of the predefined amount spent on the conversation within a predefined period when the seeker 110 is not satisfied with the conversation, wherein the request for a refund includes reasoning for the refund. Subsequently, the server system 118 may also be configured to facilitate the seeker 110 to provide a feedback about a personal experience with the at least one responder and a crowdsourcing application 124 rendered by the server system 118 upon completion of the conversation through the first communication channel or the second communication channel.

Figure 2:
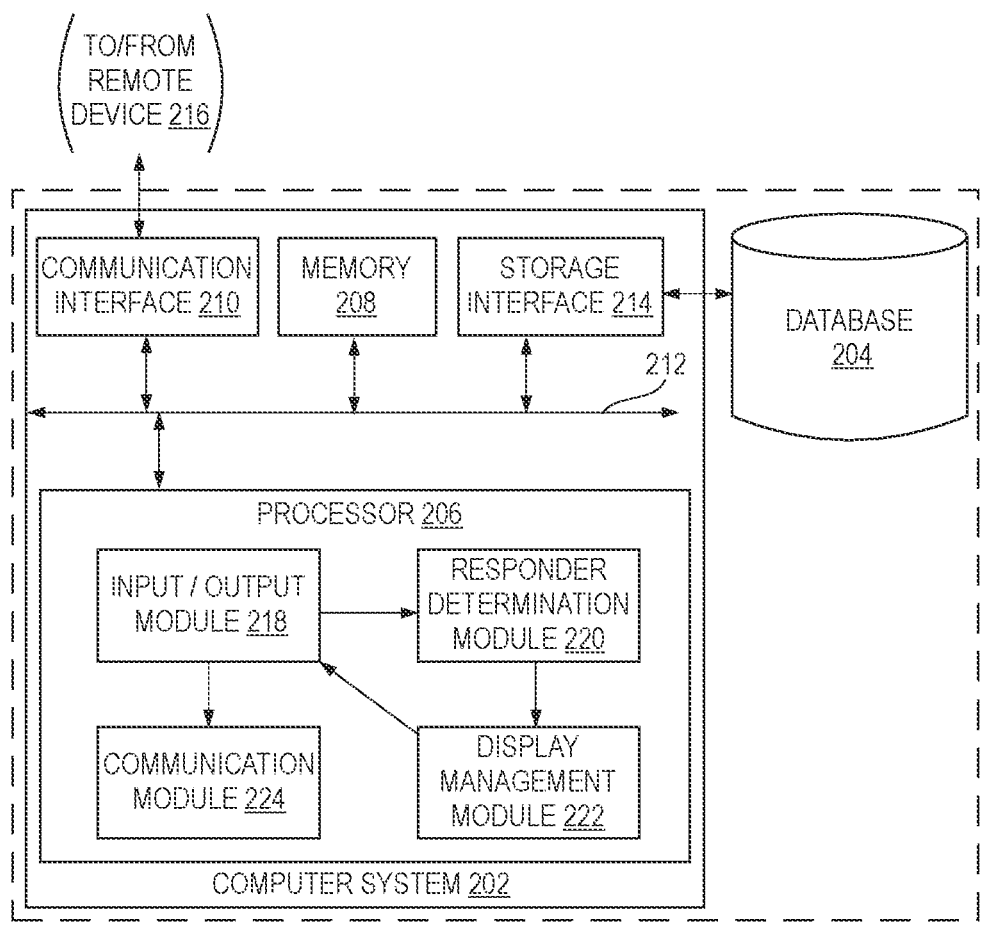
FIG. 2 is a simplified block diagram representation of a server system, in accordance with an embodiment of the present disclosure.

FIG. 2 is a simplified block diagram representation of a server system 200, in accordance with an embodiment of the present disclosure. The server system 200 is an example of the server system 118 of FIG. 1. In some embodiments, the server system 200 is embodied as a cloud-based and/or SaaS-based (software as a service) architecture. The server system 200 is configured to facilitate the seekers (e.g., seekers 110 and 112) to post the questions and seek the answers to the questions, and the responders (e.g., responders 114 and 116) to provide the answers for the questions in exchange of money through the crowdsourcing application 124.

The server system 200 includes a computer system 202 and a database 204. The database 204 is an example of the database 120 of FIG. 1. The computer system 202 includes at least one processor 206 for executing instructions, a memory 208, a communication interface 210, and a storage interface 214 that communicate with each other via a bus 212.

In some embodiments, the database 204 is integrated into the computer system 202. For example, the computer system 202 may include one or more hard disk drives as the database 204. In one embodiment, the database 204 is integrated within the computer system 202 and configured to store an instance of the crowdsourcing application 124. Further, the storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes a suitable logic, circuitry, and/or interfaces to execute computer-readable instructions for performing one or more operations for seeking answers to questions from seekers. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or cloud storage working in conjunction with the server system 200, without departing from the scope of the present disclosure.

The processor 206 is operatively coupled to the communication interface 210 such that the processor 206 is capable of communicating with a remote device 216 such as, the seeker devices 102 and 104, the responder devices 106 and 108, or with any entity connected to the network 122 (as shown in FIG. 1). In one embodiment, the processor 206 is configured to facilitate the crowdsourcing application 124 on the seeker devices 102 and 104, the responder devices 106 and 108 for enabling a plurality of functionalities to the devices described in the disclosure.

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

Further, in an embodiment, the server system 200 includes an input/output (I/O) module 218, a responder determination module 220, a display management module 222, and a communication module 224. It should be noted that components, described herein, can be configured in a variety of ways, including electronic circuitries, digital arithmetic and logic blocks, and memory systems in combination with software, firmware, and embedded technologies.

The I/O module 218 is configured to facilitate the seeker (e.g., seekers 110 and 112) to provide the question through the seeker device (e.g., seeker device 102) for receiving an answer to the question. The I/O module 218 is configured to facilitate the responders (e.g., responder 114) to provide an answer to the question through the responder device (e.g., responder device 106) in exchange for money. The I/O module 218 is configured to provide one or more user interfaces (UIs) facilitating the users 110-116 to perform one or more operations on the user devices 102-108. The one or more operations may be related to facilitating the seeking of the answers to the questions through the crowdsourcing application 124. Thus, the I/O module 218 is configured to receive the question from the seeker devices 102 and 104 and the answer from the responder devices 106 and 108.

The database 204 is further configured to store the questions and the corresponding answers received from the users 110-116. The database 204 is also configured to store one or more seeker profiles corresponding to the seekers 110 and 112, the plurality of seeker details, one or more responder profiles corresponding to the responders 114 and 116, and the plurality of responder details. Thus, login credentials corresponding to the seekers 110 and 112 and the responders 114 and 116 may also be stored in the database 204.

The responder determination module 220 is configured to determine one or more responders (e.g., responder 116) for answering the question, by identifying the available responders from the plurality of responders (e.g., responder 114 and 116) who are accessible by the server system 118 based on an availability status of each of the plurality of responders. The responder determination module 220 is further configured to determine the one or more responders for answering the question, by determining the matching responders from among the plurality of responders based on at least the threshold degree of similarity in the corresponding responder profile with the question. Further, the responder determination module 220 may be configured to determine the one or more responders for answering the question based at least on the ML model. Thus, one or more ML models that can be used for determining the one or more responders for answering the question may also be stored in the database 204. Further, in an embodiment, the database 204 may also store the availability status of each of the responders 114 and 116.

Furthermore, the display management module 222 may be configured to facilitate the display of the one or more responder profiles associated with the one or more responders 114 and 116 to the seeker device 102 in a predetermined order based at least on the one or more parameters associated with the one or more responder profiles. Thus, the database 204 may also store the one or more parameters.

Moreover, in an embodiment, the I/O module 218 may be configured to facilitate the seeker 110 to select at least one of the one or more responder profiles displayed on the seeker device 102. Further, the I/O module 218 may also be configured to receive the first selection and the second selection from the seeker device 102.

In one embodiment, the communication module 224 may be configured to establish the first communication channel between the seeker device 102 and the responder device (e.g., responder device 106) associated with the selected responder profile for providing the answer, upon receiving the first selection. In another embodiment, the communication module 224 may be configured to transmit the question to the responder devices associated with the selected multiple responder profiles. The communication module 224 may further be configured to establish the second communication channel between the seeker device 102 and at least one responder device associated with the at least one responder, upon receipt of the interest-to-answer input from the at least one responder profile.

In some exemplary embodiment, the server system 200 may also include a notification module (not shown in FIG. 2) configured to notify the single responder associated with the single responder profile and the multiple responders associated with the multiple responder profiles about the selection based on the first selection and the second selection respectively, via the predefined notification medium.

In a specific embodiment, the communication module 224 may be configured to provide at least three responding options by the selection of which multiple responders associated with selected multiple responder profiles may respond, upon transmitting the question to the responder devices associated with the selected multiple responder profiles.

Additionally, in some embodiments, the notification module may be configured to notify the seeker 110 to perform the predefined action within the threshold time via the predefined notification medium, based on the response including the selection of one of the at least three responding options by each of the multiple responders. The notification module may be further configured to trigger the seeker 110 to repeat the performing of the second selection on the seeker device 102 when the predefined action is detected to be not performed by the seeker 110 within the threshold time.

The server system 200 may also include a transaction management module (not shown in FIG. 2) configured to determine the predefined amount to be paid by the seeker 110 for unlocking the access to the answer provided to the seeker 110 through one of the first communication channel and the second communication channel, based at least on the one or more parameters and the transaction criteria. The transaction management module may further be configured to trigger the seeker 110 to perform a transaction of the predefined amount to the server system 118, upon determining the predefined amount. Further, the transaction management module may be configured to transmit the first percentage of the predefined amount to the single responder profile or one of the multiple responder profiles based at least on the establishment of the first communication channel or the second communication channel and the transaction criteria, upon receiving the predefined amount. The transaction management module may also be configured to transmit the second percentage of the predefined amount to the owner of the crowdsourcing application 124 who has built the crowdsourcing application 124.

In an exemplary embodiment, the server system 118 may further include a call management module, a token management module, a credits-and-wallet management module, a validation module, and a feedback module not shown in FIG. 2.

The call management module is configured to facilitate a recording of a conversation on the first communication channel and the second communication channel. The call management module is also configured to facilitate the one or more responders capable of answering the question to broadcast live connection requests to a plurality of seekers accessible by the server system 118.

The token management module is configured to provide cryptographic tokens for enabling the seeker 110 and 112 to purchase one or more responder services and other merchandise on a crowdsourcing application 124 rendered by the server system 118 on the seeker device 102 and 104.

The credits-and-wallet management module is configured to add credits to a seeker's wallet upon registration of the seeker 110 with the server system 118, the credits are to be used for establishing the first communication channel and the second communication channel based on the first selection and the second selection respectively. The credits-and-wallet management module is further configured to facilitate the seeker 110 and the plurality of responders to send an invitation-to-join message to corresponding personal contacts, the invitation-to-join message including a request asking the corresponding personal contact to register with the server system 118. The credits-and-wallet management module may also be configured to add a third percentage of the predefined amount to the seeker's wallet and a responder's wallet when the personal contacts that received the invitation-to-join message access the server system 118 for a predefined time period.

In addition, the validation module may be configured to facilitate the seeker 110 to validate one or more factors associated with at least one of the first communication channel, the second communication channel, and the at least one responder during an initial predefined period of the conversation between the seeker 110 and the at least one responder. In one embodiment, during the predefined period, the seeker 110 is not charged for the conversation. The validation module may further be configured to facilitate the seeker 110 and the one or more responders 114 and 116 to report a complaint about each other based at least on the conversation.

The validation module may further be configured to facilitate the seeker 110 to request for refund of the predefined amount spent on the conversation within a predefined period when the seeker 110 is not satisfied with the conversation, wherein the request for a refund includes reasoning for the refund.

Subsequently, the feedback module is configured to facilitate the seeker 110 to provide a feedback about a personal experience with the at least one responder and a crowdsourcing application 124 rendered by the server system 118 upon completion of the conversation through the first communication channel or the second communication channel.

One or more modules of the processor 206 including the responder determination module 220, the display management module 222, the communication module 224, the notification module, and the transaction management module can be configured in a variety of ways using hardware configurations, embedded systems, control logical blocks, software modules, and their combinations. For example, the various operations, blocks, etc., described herein may be enabled and operated using hardware circuitry (for example, complementary metal-oxide semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Figure 3:
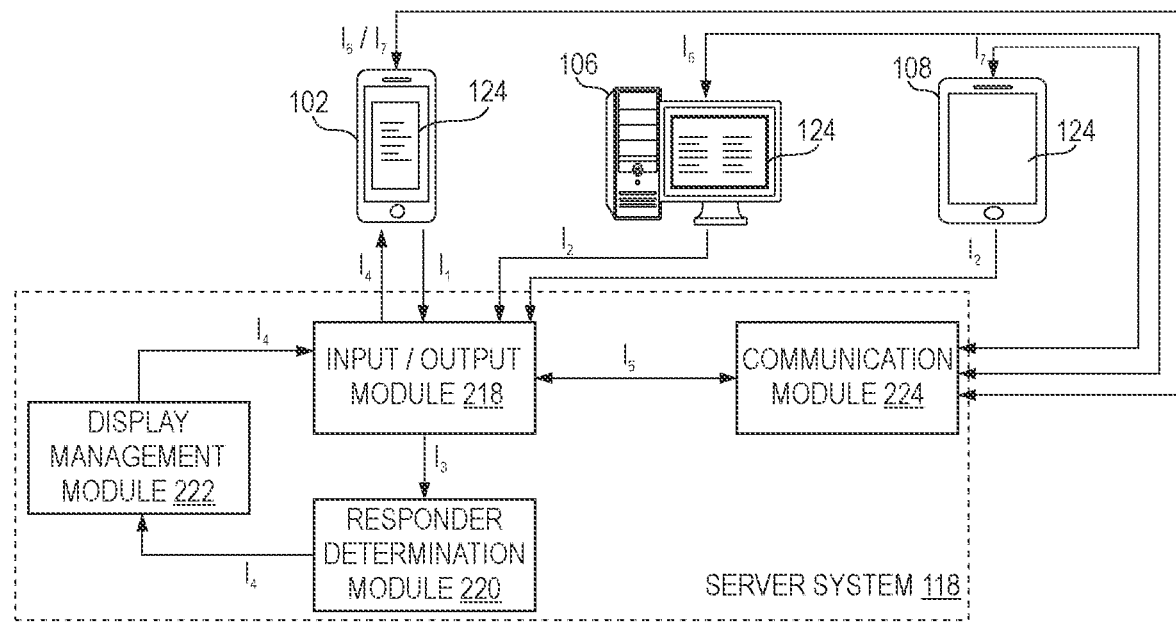
FIG. 3 is a block diagram representation illustrating an environment depicting system components communicating with each other for seeking answers to questions, in accordance with an embodiment of the present disclosure.

FIG. 3 is a block diagram representation illustrating an environment 300 depicting system components communicating with each other for seeking answers to questions, in accordance with an embodiment of the present disclosure. In one embodiment, the system components may include the server system 118 including the I/O module 218, the responder determination module 220, the display management module 222, the communication module 224, the seeker device 102 having an instance of the crowdsourcing application 124, the responder device 106 having an instance of the crowdsourcing application 124, and the responder device 108 having an instance of the crowdsourcing application 124.

As an example, the system components are communicating with each other by exchanging information such as $I_1$, $I_2$, $I_3$, $I_4$, $I_5$, $I_6$, and $I_7$ as depicted in FIG. 3. The I/O module 218 facilitates the seeker 110 to provide the question through the seeker device 102. The seeker 110 enters the question onto a UI associated with the crowdsourcing application 124 accessed by the seeker 110 on the seeker device 102. Thus, in one embodiment, the information $I_1$ includes the question, thereby implying that the I/O module 218 receives the question.

The I/O module 218 also receives the plurality of responder details and the availability status corresponding to the responders 114 and 116 from the responder devices 106 and 108 respectively. The plurality of responder details and the availability status are depicted as the information $I_2$.

The responder determination module 220 determines one or more responders (e.g., responder 116) for answering the question, by identifying available responders from a plurality of responders (e.g., responder 114 and 116) who are accessible by the server system 118 based on an availability status of each of the plurality of responders. The responder determination module 220 determines the one or more responders for answering the question, by determining matching responders from among the plurality of responders based on at least a threshold degree of similarity in a corresponding responder profile with the question. Here, information received by the responder determination module 220 is depicted in FIG. 3 as the information $I_3$, wherein the information $I_3$ refers to the information $I_1$, the information $I_2$, or a combination thereof. An output of the responder determination module 220 is depicted in FIG. 3 as the information $I_4$, wherein the information $I_4$ may correspond to the one or more responders determined to be the responders that can answer the question from the seeker 110.

Further, the information $I_4$ is transmitted to the display management module 222, wherein the display management module 222 facilitates a display of one or more responder profiles associated with the one or more responders to the seeker device 102 in a predetermined order based at least on the one or more parameters associated with the one or more responder profiles. Further, in order to display the one or more responder profiles on the seeker device 102, the information $I_4$ is transmitted to the I/O module 218 which outputs the information $I_4$ to the seeker device 102.

Then, in one scenario, the seeker 110 selects a single responder profile of the one or more responder profiles displayed on the seeker device 102. Thus, in this scenario, the information $I_1$ changes to the first selection which corresponds to the selection of the single responder profile. The single responder profile may correspond to the responder 114 associated with the responder device 106. Thus, the communication module 224 receives the notification which is depicted as the information $I_5$. Then, the communication module 224 establishes the first communication channel between the seeker device 102 and the responder device 106. Then, a conversation between the seeker 110 and the responder 114 is depicted in FIG. 3 as the information $I_6$.

In another scenario, the seeker 110 selects multiple responder profiles of the one or more responder profiles displayed on the seeker device 102. Thus, in this scenario, the information $I_1$ changes to the second selection which corresponds to the selection of the multiple responder profiles. The multiple responder profiles may correspond to the responders 114 and 116 associated with the responder device 106 and 108 respectively. Thus, the communication module 224 receives the notification which is depicted as the information $I_5$ in FIG. 3. Then, the communication module 224 transmits the question to the responder devices 106 and 108 associated with the selected multiple responder profiles. In this scenario, the information $I_5$ also includes the question. Then, the communication module 224 establishes a second communication channel between the seeker device 102 and at least one responder device 106 or 108 associated with the at least one responder, upon receipt of interest-to-answer input from at least one responder profile.

In one embodiment, the second communication channel between the seeker device 102 and the responder device 106 may be established when the responder 114 associated with responder device 106 sends the interest-to-answer input satisfying the predefined criteria. Thus, the information $I_5$ may also include the interest-to-answer input. Then, a conversation between the seeker 110 and the responder 114 is depicted in FIG. 3 as the information $I_6$. In another embodiment, the second communication channel between the seeker device 102 and the responder device 108 may be established when the responder 116 associated with responder device 108 sends the interest-to-answer input satisfying the predefined criteria. Thus, the information $I_5$ may also include the interest-to-answer input. Then, a conversation between the seeker 110 and the responder 116 is depicted in FIG. 3 as the information $I_7$. Further, the seeker 110 makes the payment of the predefined amount which is notified to the responder 114 or 116, and this notification is communicated to them through the communication module 224, and hence the information $I_7$ may also include this notification.

Figure 4A:
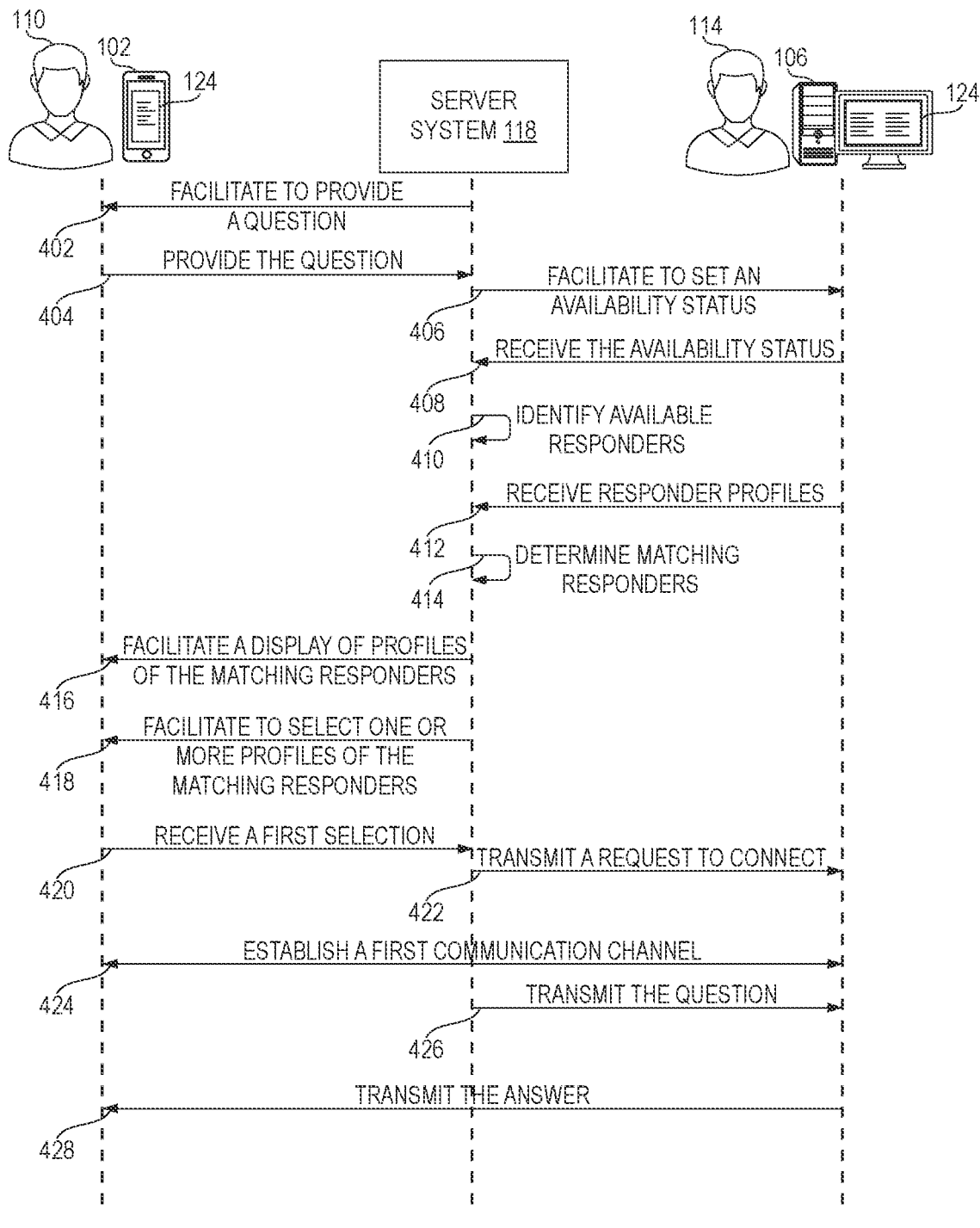
FIG. 4A is a sequence flow diagram for depicting a process flow for seeking answers from a single responder, in accordance with an embodiment of the present disclosure.

FIG. 4A is a sequence flow diagram 400 for depicting a process flow for seeking answers from a single responder, in accordance with an embodiment of the present disclosure. The seeker device 102, the server system 118, and the responder device 106 are described with reference to FIG. 1. Operations of the flow diagram 400, and combinations of the operations in the flow diagram 400, may be implemented by, for example, hardware, firmware, a processor, circuitry, and/or a different device associated with the execution of software that includes one or more computer program instructions. The sequence of operations of the flow diagram 400 may not be necessarily executed in the same order as they are presented. Further, one or more operations may be grouped and performed in the form of a single step, or one operation may have several sub-steps that may be performed in parallel or a sequential manner. The flow diagram 400 starts from 402.

At 402, the server system 118 facilitates the seeker 110 to provide a question through the seeker device 102 for receiving an answer to the question.

At 404, the seeker 110 provides the question to the server system 118 through the crowdsourcing application 124 on the seeker device 102. Thus, the server system 118 receives the question from the seeker 110 through the seeker device 102.

At 406, the server system 118 facilitates the responder 114 to set the availability status associated with a responder profile corresponding to the responder 114 to either 'online' or 'offline'. Further, the responder 114 sets the availability status based on their availability.

At 408, the server system 118 reads the availability status by receiving the availability status from the responder device 106.

At 410, The server system 118 identifies available responders from a plurality of responders who are accessible to the server system 118 based on the availability status. The server system 118 is identifying if the responder 114 is available or not based on the availability status received from the responder device 106.

At 412, the server system 118 receives responder profiles corresponding to the plurality of responders for determining matching responders. The server system 118 is receiving a responder profile corresponding to the responder 114 from the responder device 106.

At 414, the server system 118 determines the matching responders of the plurality of responders based on at least a threshold degree of similarity in a corresponding responder profile with the question. The server system 118 is determining if the responder profile received from the responder device 106 is one of the matching responders.

At 416, the server system 118 facilitates a display of profiles of the matching responders on the seeker device 102. The server system 118 is facilitating the display of the responder profile received from the responder device 106 when the responder 114 associated with the responder profile comes under the matching responders.

At 418, the server system 118 facilitates the seeker 110 to select one or more profiles of the matching responders. The server system 118 is facilitating the seeker 110 to select the responder profile associated with the responder 114 on the seeker device 102 as the responder 114 comes under the matching responders.

At 420, the server system 118 receives a first selection of a single responder profile of the one or more responder profiles determined earlier to be capable of answering the question, from the seeker device 102. Here, the single responder profile corresponds to the responder profile associated with the responder 114.

At 422, the server system 118 transmits a request to connect with the responder 114 in a form of a call, as the first selection corresponds to directly placing a call for the responder 114.

At 424, the server system 118 establishes a first communication channel between the seeker device 102 and the responder device 106. This enables the seeker 110 and the responder 114 to have a conversation with each other related to the answer to the question through the call that is established by the first communication channel.

At 426, the server system 118 transmits the question to the responder device 106 through the first communication channel.

At 428, the responder 114 transmits the answer to the question from the responder device 106 to the seeker device 102 via the server system 118.

Figure 4B:
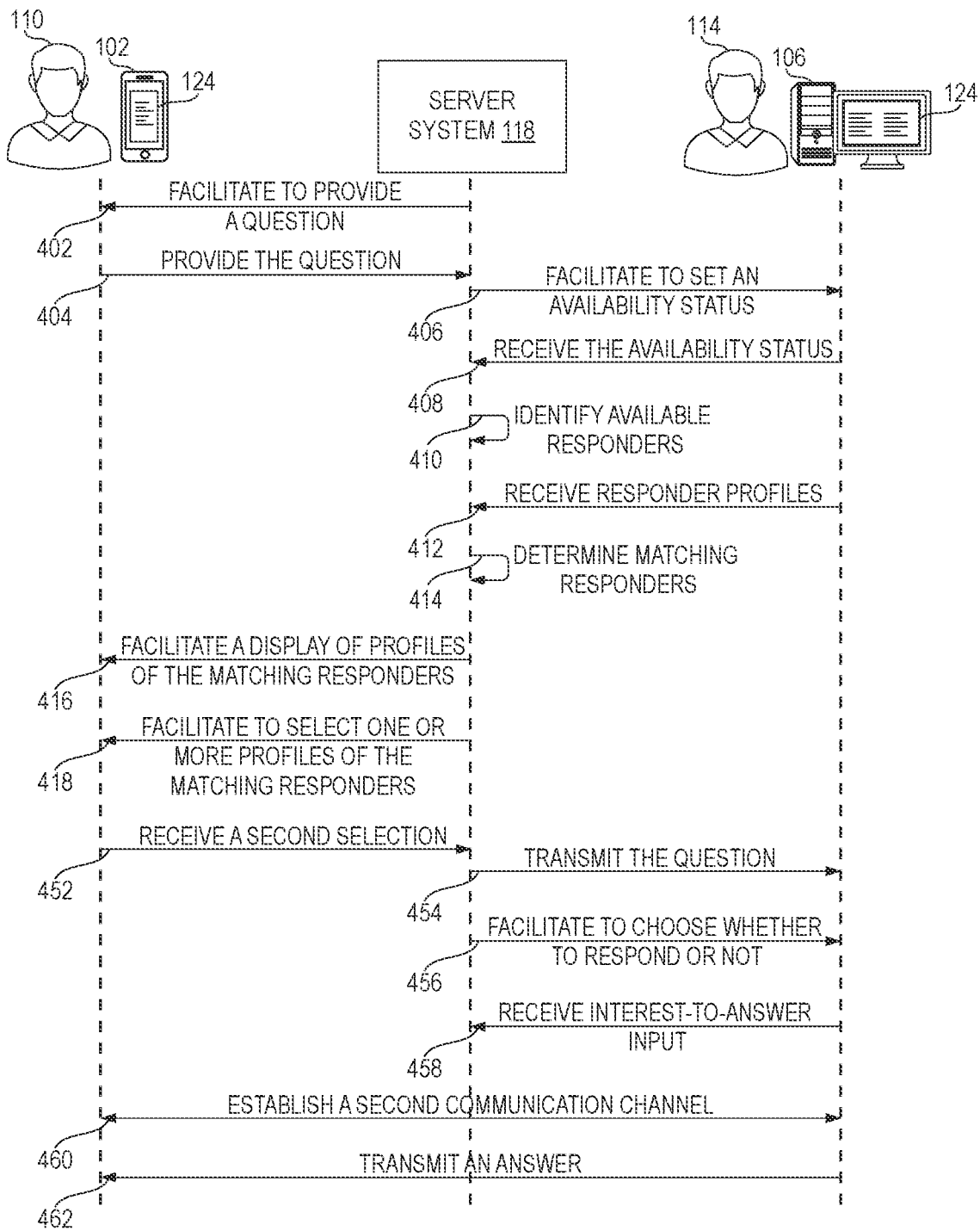
FIG. 4B is a sequence flow diagram for depicting a process flow for seeking answers from multiple responders, in accordance with an embodiment of the present disclosure.

FIG. 4B is a sequence flow diagram 450 for depicting a process flow for seeking answers from multiple responders, in accordance with an embodiment of the present disclosure. The seeker device 102, the server system 118, and the responder device 106 are described with reference to FIG. 1. Operations of the flow diagram 450, and combinations of the operations in the flow diagram 450, may be implemented by, for example, hardware, firmware, a processor, circuitry, and/or a different device associated with the execution of software that includes one or more computer program instructions. The sequence of operations of the flow diagram 450 may not be necessarily executed in the same order as they are presented. Further, one or more operations may be grouped and performed in the form of a single step, or one operation may have several sub-steps that may be performed in parallel or a sequential manner. The sequence flow diagram 450 includes steps that are similar to the steps in the sequence flow diagram 400 as depicted in FIG. 4A starting from 402 to 418. The steps are different from step 452.

At 452, the server system 118 receives a second selection of multiple responder profiles of the one or more responder profiles determined earlier to be capable of answering the question, from the seeker device 102. Here, one of the multiple responder profiles corresponds to the responder profile associated with the responder 114.

At 454, the server system 118 transmits the question to the multiple responders. FIG. 5B only depicts the responder 114, however, the transmission of the question is happening to each of the multiple responders.

At 456, the server system 118 facilitates the multiple responders to choose whether to respond or not. FIG. 5B only depicts the server system 118 facilitating the responder 114 to choose whether to respond or not, however, the server system 118 is facilitating the multiple responders.

At 458, the server system 118 receives an interest-to-answer input from the responder 114 when the responder 114 selects an immediate connecting option on the crowdsourcing platform 124 through the responder device 106.

At 460, the server system 118 establishes a second communication channel between the seeker device 102 and at least one responder device associated with the at least one responder of the one or more responders. FIG. 4B depicts the establishment of the second communication channel between the seeker device 102 and the responder device 106. This enables the seeker 110 and the responder 114 to have a conversation with each other related to the answer to the question through the call that is established by the second communication channel.

At 462, the responder 114 transmits the answer to the question from the responder device 106 to the seeker device 102 via the server system 118.

Figure 5A:
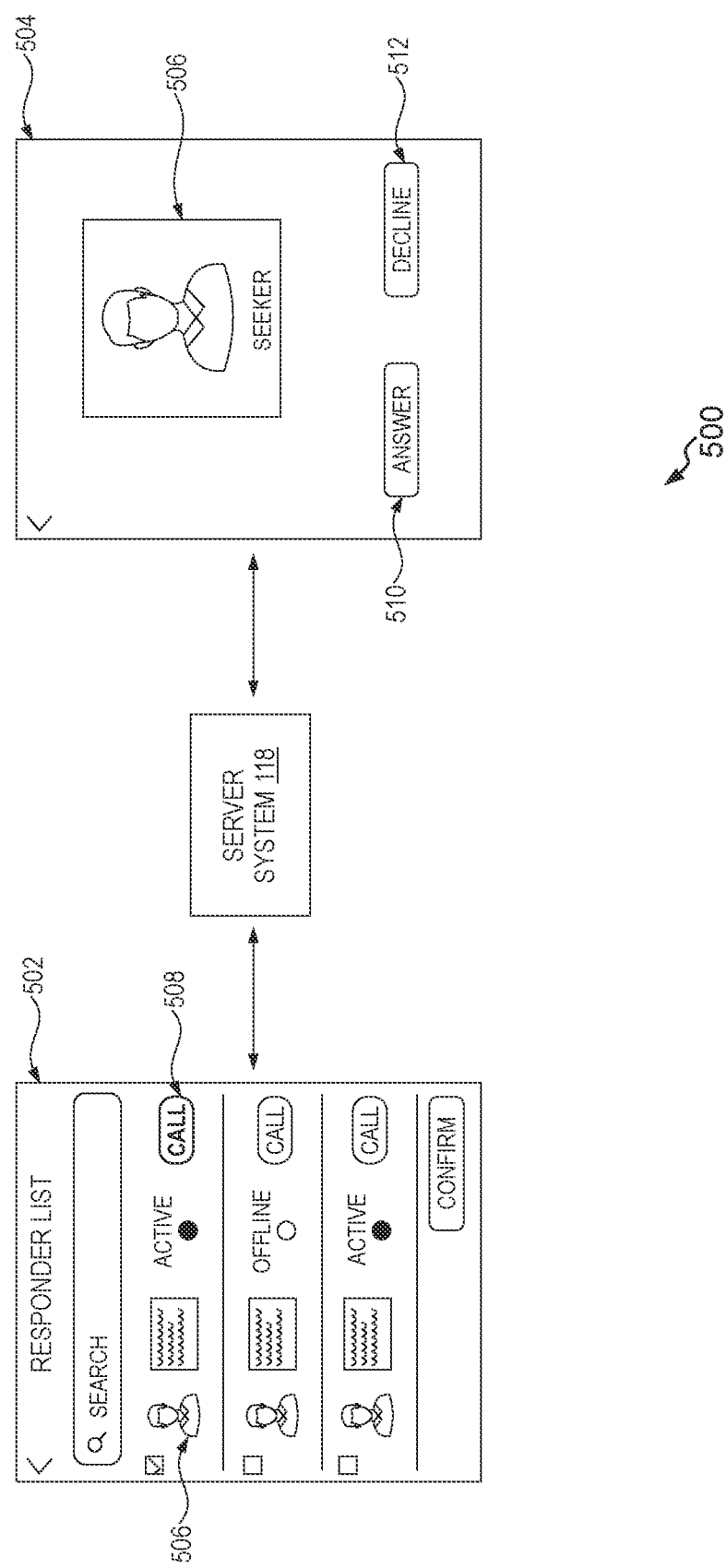
FIGS. 5A and 5B represent an example representation of user interfaces (UIs) rendered in a crowdsourcing application provided by a server system enabling seekers to seek answers, in accordance with an example embodiment of the present disclosure.
Figure 5B:
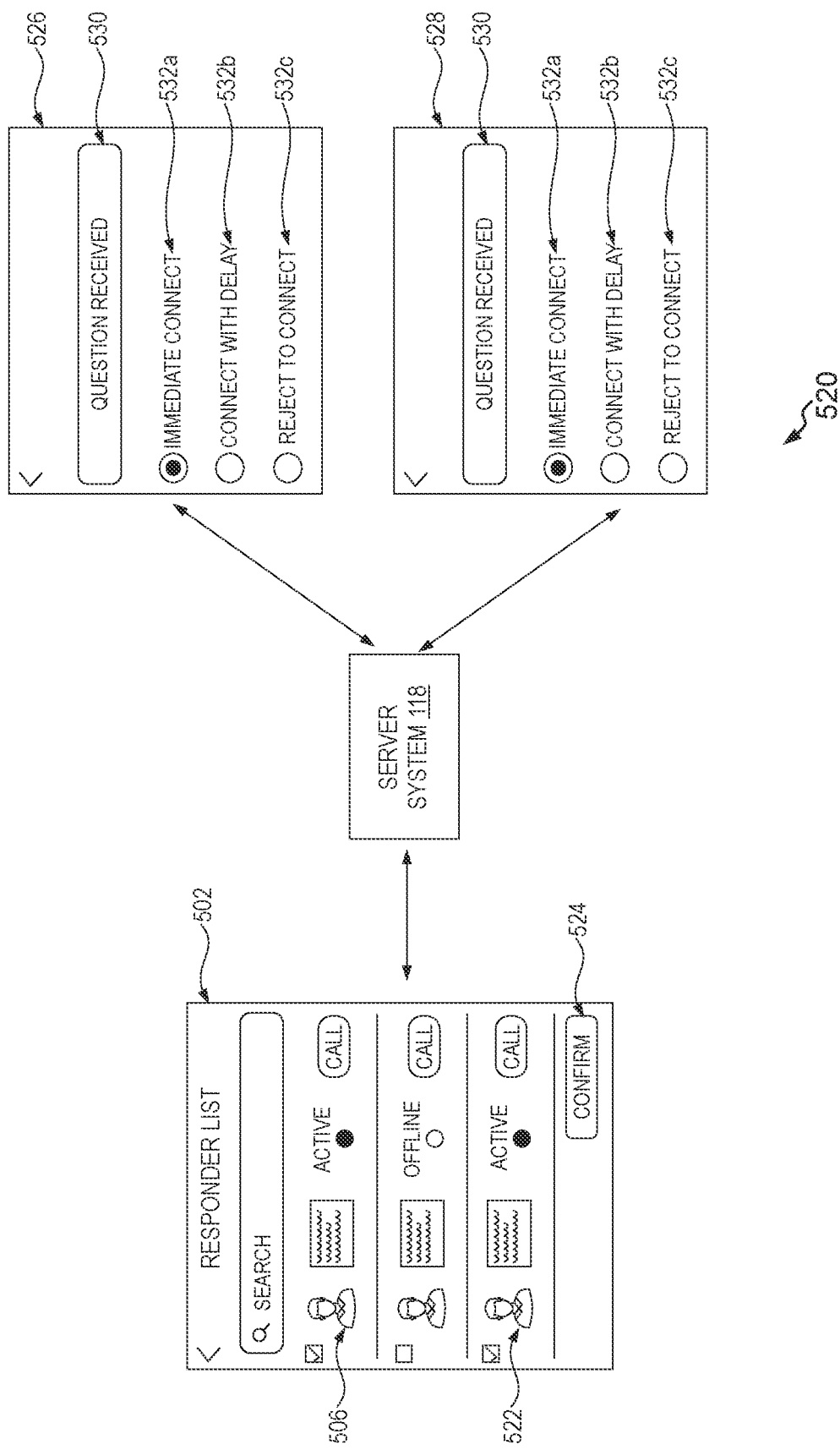

FIGS. 5A and 5B represent an example representation of user interfaces (UIs) rendered in the crowdsourcing application 124 provided by the server system 118 enabling the seekers 110 and 112 to seek answers, in accordance with an example embodiment of the present disclosure. The UIs depicted for seeking answers in the crowdsourcing application 124 are rendered for the seeker 110 and the responders 114 and 116 based on receipt of the question from the seeker 110 as explained above.

Referring now to FIG. 5A, an exemplary scenario 500 depicting a UI 502 displaying the one or more responder profiles associated with the one or more responders for the seeker 110 to select at least one of the one or more responder profiles. FIG. 5A also depicts a UI 504 displaying an indication of receiving a call from the seeker 110. Further, the exemplary scenario 500 depicted in FIG. 5A corresponds to a scenario in which the seeker 110 may have to perform the first selection of a single responder profile of the one or more responder profiles displayed on the UI 502 associated with the seeker device 102. Further, the corresponding UI 504 appears on the responder device 106 associated with a responder 114 having a responder profile selected based on the first selection. Furthermore, the UI 502 is communicating with the UI 504 through the server system 118 that has provided an instance of the crowdsourcing application 124 launched on the seeker device 102 and the responder device 106. Thus, the UI 502 is associated with the crowdsourcing application 124 launched on the seeker device 102. Similarly, the UI 504 is associated with the crowdsourcing application 124 launched on the responder device 106.

In one embodiment, the seeker device 102 and the responder device 106 may include, but are not limited to, a mobile phone, a tablet, a laptop, a desktop computer, or the like. Further, the crowdsourcing application 124 may be a mobile application, a web-based application, a website browser, and the like. Thus, a format of the UIs 502 and 504 is dependent of a type of the seeker device 102 and the responder device 106 respectively and a type of the crowdsourcing application 124 that is launched in the seeker device 102 and the responder device 106.

Further, the UI 502 depicts the first selection including a selection of a responder profile 506 that is associated with the responder 114, from a list of one or more responder profiles displayed on the UI 502. Each profile in the list is associated with multiple fields, the selection of which by the seeker 110 triggers multiple operations. In one embodiment, the multiple fields include a profile selection field indicated as squared boxes, upon selection of a profile, a tick mark appears in a squared box beside the profile selected by the seeker 110. The multiple fields also include a status indicator field indicated as circles, upon selection of which a profile corresponding to a circle that is selected indicates the availability status of that profile is 'online'. This means that the responder corresponding to the profile is available and can be contacted instantly. The multiple fields also include a call button and a confirm button. Upon clicking on the call button a call can be directly placed by the seeker 110.

Thus, in this scenario, a first profile in the list displayed in the UI 502 corresponds to a profile of the responder 114, and the seeker 110 selects the same profile by placing the call by clicking on the call button 508 as shown in FIG. 5A. Upon clicking on the call button 508, the call is placed for the responder 114, and hence the UI 504 on the responder device 106 displays a seeker profile of the seeker 110 who placed the call, with options to answer or decline the incoming call, by clicking on an answer button 510 or a decline button 512.

Referring to FIG. 5B, another exemplary scenario 520 depicting the UI 502 displaying the same list as described above. However, profiles selected by the seeker 110 are based on the second selection. Thus, responder profiles 506 and 522 are selected by the seeker 110. The responder profiles 506 and 522 correspond to the responders 114 and 116 respectively. Upon selection, the seeker 110 clicks on the confirm button 524 as shown in FIG. 5B. Upon clicking on the confirm button 524, UIs 526 and 528 as shown in FIG. 5B appears on the responder devices 106 and 108 associated with the responders 114 and 116 respectively. Information appearing on the UI 526 and UI 528 may include a question received notification 530, and then the responders 114 and 116 are provided with three options such as immediate connect option 532a, connect with delay 532b, and reject to connect 532c. The responders 114 and 116 may have to select one of the three options. The FIG. 5B depicts that both the responders 114 and 116 have selected the first option which is the immediate connect option 532a. However, based on which responder made the selection first, the server system 118 may decide the priority. Suppose the responder 114 selected the immediate connect option 532a before the responder 116. Then, the responder 114 is connected with the seeker 110 through the second communication channel.

Figure 6:
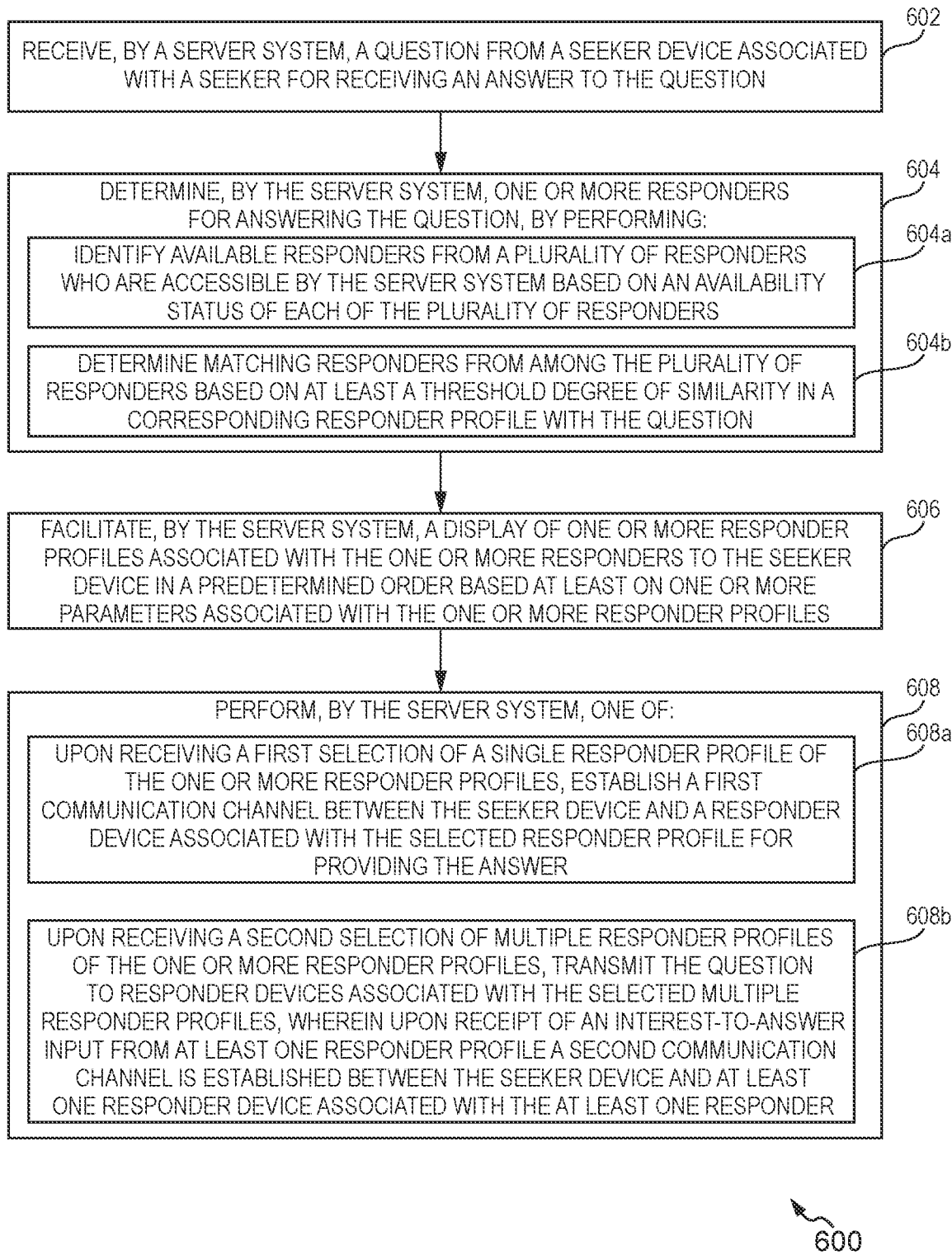
FIG. 6 is a flowchart illustrating a computer-implemented method for seeking answers, in accordance with an embodiment of the present disclosure.

FIG. 6 is a flow diagram of a computer-implemented method 600 for seeking answers, in accordance with an embodiment of the present disclosure. The method 600 depicted in the flow diagram may be executed by, for example, the at least one server system such as the server system 118. Operations of the flow diagram of the method 600, and combinations of operations in the flow diagram of the method 600, may be implemented by, for example, hardware, firmware, a processor, circuitry, and/or a different device associated with the execution of software that includes one or more computer program instructions. The method 600 starts at operation 602.

At 602, the method 600 includes receiving, by the server system 118, a question from a seeker device 102 associated with a seeker 110 for receiving an answer to the question.

At 604, the method 600 includes determining, by the server system 118, one or more responders for answering the question, by performing operations 604a and 604b.

At 604a, the method 600 includes identifying available responders from a plurality of responders who are accessible by the server system 118 based on an availability status of each of the plurality of responders.

At 604b, the method 600 includes determining matching responders from among the plurality of responders based on at least a threshold degree of similarity in a corresponding responder profile with the question.

At 606, the method 600 includes facilitating, by the server system 118, a display of one or more responder profiles associated with the one or more responders 114 and 116 to the seeker device 102 in a predetermined order based at least on one or more parameters associated with the one or more responder profiles.

At 608, the method 600 includes performing one of operations 608a and 608b.

At 608a, the method 600 includes upon receiving a first selection of a single responder profile of the one or more responder profiles, establishing a first communication channel between the seeker device 102 and a responder device 106 associated with the selected responder profile for providing the answer.

At 608b, the method 600 includes upon receiving a second selection of multiple responder profiles of the one or more responder profiles, transmitting the question to responder devices 106 and 108 associated with the selected multiple responder profiles, wherein upon receipt of interest-to-answer input from at least one responder profile a second communication channel is established between the seeker device 102 and at least one responder device 106 or 108 associated with the at least one responder.

Figure 7:
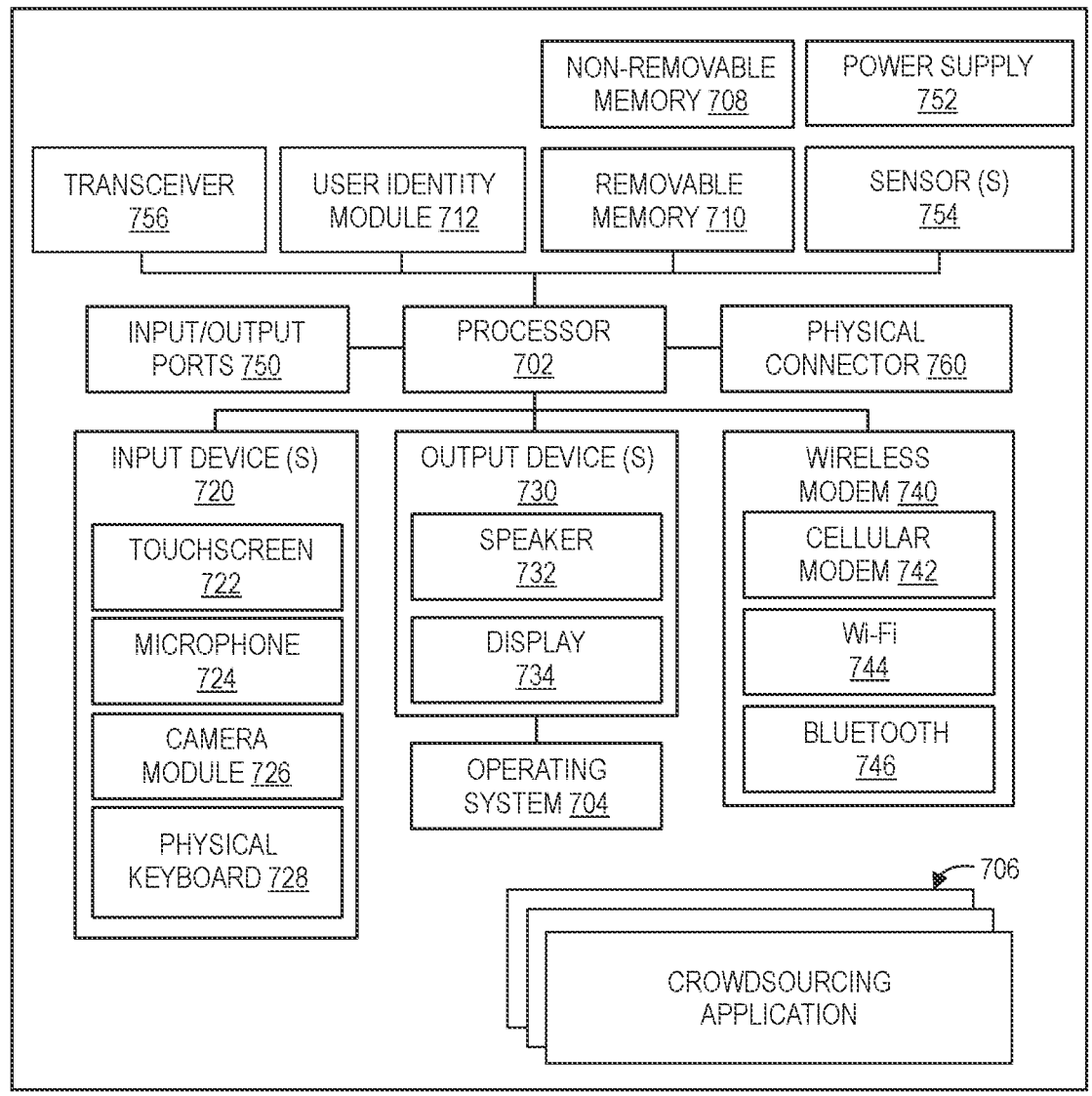
FIG. 7 is a simplified block diagram of an electronic device, in accordance with an embodiment of the present disclosure.

FIG. 7 shows simplified block diagram of a user device 700 for example a mobile phone or a desktop computer capable of implementing the various embodiments of the present disclosure. For example, the user device 700 may correspond to the user devices 102-108 of FIG. 1. The user device 700 is depicted to include one or more applications such as a crowdsourcing application 706 facilitated by the server system 118. The crowdsourcing application 706 can be an instance of an application downloaded from the server system 118 or a third-party server. The crowdsourcing application 706 is capable of communicating with the server system 118 for facilitating seeking of answers shown in FIG. 1.

It should be understood that the user device 700 as illustrated and hereinafter described is merely illustrative of one type of device and should not be taken to limit the scope of the embodiments. As such, it should be appreciated that at least some of the components described below in connection with the user device 700 may be optional, and thus in an example embodiment may include more, less, or different components than those described in connection with the example embodiment of FIG. 7. As such, among other examples, the user device 700 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 700 includes a controller or a processor 702 (e.g., a signal processor, microprocessor, ASIC, or other control and processing logic circuitry) for performing such tasks as signal coding, data processing, image processing, input/output processing, power control, and/or other functions. An operating system 704 controls the allocation and usage of the components of the user device 700 and supports one or more applications programs such as the crowdsourcing application 706, that implements one or more of the innovative features described herein. In addition to the crowdsourcing application 706, the applications may include common mobile computing applications (e.g., telephony applications, email applications, calendars, contact managers, web browsers, messaging applications) or any other computing application.

The illustrated user device 700 includes one or more memory components, for example, a non-removable memory 708 and/or removable memory 710. The non-removable memory 708 and/or the removable memory 710 may be collectively known as a database in an embodiment. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the crowdsourcing application 706. The user device 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in form of the SIM card is well known in Global Systems for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 700 can support one or more input devices 720 and one or more output devices 730. Examples of the input devices 720 may include, but are not limited to, a touch screen/a display screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to, a speaker 732 and a display 734. Other possible output devices can include piezoelectric or other haptic output devices. Some devices can serve more than one input/output function. For example, the touch screen 722 and the display 734 can be combined into a single input/output device.

A wireless modem 740 can be coupled to one or more antennas (not shown in FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device, or a local wireless data network or router, and/or a Bluetooth-compatible modem 746. The wireless modem 740 is typically configured for communication with one or more cellular networks, such as a GSM network for data and voice communications within a single cellular network, between cellular networks, or between the user device 700 and a public switched telephone network (PSTN).

The user device 700 can further include one or more input/output ports 750, a power supply 752, one or more sensors 754 for example, an accelerometer, a gyroscope, a compass, or an infrared proximity sensor for detecting the orientation or motion of the user device 700 and biometric sensors for scanning biometric identity of an authorized user, a transceiver 756 (for wirelessly transmitting analog or digital signals) and/or a physical connector 760, which can be a USB port, IEEE 794 (FireWire) port, and/or RS-232 port. The illustrated components are not required or all-inclusive, as any of the components shown can be deleted and other components can be added.

The disclosed method 600 with reference to FIG. 6, or one or more operations of the method 600 may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Particularly, the server system 118 and its various components such as the computer system 202 and the database 204 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or the computer to perform one or more operations. A computer-readable medium storing, embodying, or encoded with a computer program, or similar language may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g. magneto-optical disks), CD-ROM (compact disc read-only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based on these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
receiving, by a server system, a question from a seeker device associated with a seeker for receiving an answer to the question;
determining, by the server system, one or more responders for answering the question, by performing:
identifying available responders from a plurality of responders who are accessible by the server system based on an availability status of each of the plurality of responders; and
determining matching responders from among the plurality of responders based on at least a threshold degree of similarity in a corresponding responder profile with the question;
facilitating, by the server system, a display of one or more responder profiles associated with the one or more responders to the seeker device in a predetermined order based at least on one or more parameters associated with the one or more responder profiles; and
performing, by the server system:
upon receiving a first selection of a single responder profile of the one or more responder profiles, establishing a first communication channel between the seeker device and a responder device associated with the selected responder profile for providing the answer;
upon receiving a second selection of multiple responder profiles of the one or more responder profiles, transmitting the question to responder devices associated with the selected multiple responder profiles, wherein upon receipt of an interest-to-answer input from at least one responder profile a second communication channel is established between the seeker device and at least one responder device associated with the at least one responder;
determining, by the server system, a predefined amount to be paid by the seeker for unlocking an access to the answer provided to the seeker through one of the first communication channel and the second communication channel, based at least on the one or more parameters and transaction criteria;
upon determining the predefined amount, triggering, by the server system, the seeker to perform a transaction of the predefined amount to the server system; and
upon receiving the predefined amount, transmitting, by the server system, a first percentage of the predefined amount to the single responder profile or one of the multiple responder profiles based at least on an establishment of the first communication channel or the second communication channel and the transaction criteria.

2. The computer-implemented method as claimed in claim 1, wherein determining the one or more responders for answering the question comprises determining the one or more responders for answering the question based at least on a machine learning model.

3. The computer-implemented method as claimed in claim 1, further comprising enabling the plurality of responders to set the availability status and a charge rate for answering questions via corresponding a plurality of responder devices associated with the plurality of responders.

4. The computer-implemented method as claimed in claim 1, wherein the one or more parameters include at least one of a rate set by the one or more responders for answering the question, a rating associated with the one or more responder profiles, quality of answers, and time dedicated by the seeker for answering the questions.

5. The computer-implemented method as claimed in claim 1, further comprising notifying, by the server system, a single responder associated with the single responder profile and multiple responders associated with the multiple responder profiles based on the first selection and the second selection respectively, via a predefined notification medium.

6. The computer-implemented method as claimed in claim 1, wherein the first communication channel and the second communication channel are configured to be associated with one or more features, the one or more features comprising at least one of a chat that may be used for sharing one or more file attachments, whiteboarding, screen sharing, a video calling facility, projecting a hologram video in space which may be implemented via smart devices having inbuilt hologram projection capabilities.

7. The computer-implemented method as claimed in claim 1, further comprising upon transmitting the question to the responder devices associated with the selected multiple responder profiles, providing, by the server system, at least three responding options by a selection of which multiple responders associated with the selected multiple responder profiles respond, the at least three responding options comprising an immediate connecting option, a connecting with a predefined delay option, and rejecting to connect option.

8. The computer-implemented method as claimed in claim 7, further comprising:
notifying, by the server system, the seeker to perform a predefined action within a threshold time via a predefined notification medium, based on a response comprising the selection of one of the at least three responding options by each of the multiple responders; and
triggering, by the server system, the seeker to repeat the performing of the second selection on the seeker device when the predefined action is detected to be not performed by the seeker within the threshold time.

9. The computer-implemented method as claimed in claim 1, further comprising determining, by the server system, a priority of a response received from the selected multiple responder profiles based at least on predefined criteria, the predefined criteria comprising prioritizing a response comprising an immediate connecting option that is received first in time among multiple responses received from the selected multiple responder profiles.

10. The computer-implemented method as claimed in claim 1, further comprising facilitating, by the server system, one or more additional features for the seeker and the one or more responders, the one or more additional features comprising at least one of recording the conversation, broadcasting live connection request, providing cryptographic tokens, adding credits to a seeker's wallet, earning a third percentage of the predefined amount upon sending an invitation-to-join message, validating one or more factors associated with at least one of the first communication channel, the second communication channel, and the at least one responder, reporting a complaint, requesting for refund of the predefined amount, and providing a feedback.

11. A server system, comprising:
a memory configured to store instructions;
a communication interface; and
a processor in communication with the memory and the communication interface, the processor configured to execute the instructions stored in the memory and thereby cause the server system to perform at least in part to:
receive a question from a seeker device associated with a seeker for receiving an answer to the question;
determine one or more responders for answering the question, by performing;
identifying available responders from a plurality of responders who are accessible by the server system based on an availability status of each of the plurality of responders; and
determining matching responders from among the plurality of responders based on at least a threshold degree of similarity in a corresponding responder profile with the question;
facilitate a display of one or more responder profiles associated with the one or more responders to the seeker device in a predetermined order based at least on one or more parameters associated with the one or more responder profiles;
perform:
upon receiving a first selection of a single responder profile from the one or more responder profiles, establishing a first communication channel between the seeker device and a responder device associated with the selected responder profile for providing the answer; and
upon receiving a second selection of multiple responder profiles of the one or more responder profiles, transmitting the question to responder devices associated with the selected multiple responder profiles, wherein upon receipt of an interest-to-answer input from at least one responder profile a second communication channel is established between the seeker device and at least one responder device associated with the at least one responder;
determine a predefined amount to be paid by the seeker for unlocking an access to the answer provided to the seeker through one of the first communication channel and the second communication channel, based at least on the one or more parameters and transaction criteria;
upon determining the predefined amount, trigger the seeker to perform a transaction of the predefined amount to the server system; and
upon receiving the predefined amount, transmit a first percentage of the predefined amount to the single responder profile or one of the multiple responder profiles based at least on the establishment of the first communication channel or the second communication channel and the transaction criteria.

12. The server system as claimed in claim 11, further caused to determine the one or more responders for answering the question based at least on a machine learning model.

13. The server system as claimed in claim 11, further caused to set the availability status and a charge rate for answering questions via corresponding a plurality of responder devices associated with the plurality of responders.

14. The server system as claimed in claim 11, further caused to notify a single responder associated with the single responder profile and multiple responders associated with the multiple responder profiles based on the first selection and the second selection respectively, via a predefined notification medium.

15. The server system as claimed in claim 11, further caused to provide at least three responding options by a selection of which multiple responders associated with selected multiple responder profiles respond, upon transmitting the question to the responder devices associated with the selected multiple responder profiles, the at least three responding options comprising an immediate connecting option, a connecting with a predefined delay option, and rejecting to connect option.

16. The server system as claimed in claim 15, further caused to: notify the seeker to perform a predefined action within a threshold time via a predefined notification medium, based on the response comprising the selection of one of the at least three responding options by each of the multiple responders; and trigger the seeker to repeat the performing of the second selection on the seeker device when the predefined action is detected to be not performed by the seeker within the threshold time.

17. The server system as claimed in claim 11, further caused to determine a priority of a response received from the selected multiple responder profiles based at least on predefined criteria, the predefined criteria comprising prioritizing a response comprising an immediate connecting option that is received first in time among multiple responses received from the selected multiple responder profiles.

18. The server system as claimed in claim 11, further caused to facilitate one of more additional features for the seeker and the one or more responders, the one or more additional features comprising at least one of recording the conversation, broadcasting live connection request, providing cryptographic tokens, adding credits to a seeker's wallet, earning a third percentage of the predefined amount upon sending an invitation-to-join message, validating one or more factors associated with at least one of the first communication channel, the second communication channel, and the at least one responder, reporting a complaint, requesting for refund of the predefined amount, and providing a feedback.

* * * * *